United States Patent [19]

Deibele

[11] 4,174,596

[45] Nov. 20, 1979

[54] DETACHABLE INSULATING COVER ASSEMBLY FOR GREENHOUSES AND THE LIKE

[75] Inventor: Manfred Deibele, Eislingen, Fed. Rep. of Germany

[73] Assignee: Deibele GmbH & Co., Uhingen, Fed. Rep. of Germany

[21] Appl. No.: 835,540

[22] Filed: Sep. 22, 1977

[30] Foreign Application Priority Data

Sep. 22, 1976 [DE] Fed. Rep. of Germany ....... 2642543
Mar. 23, 1977 [DE] Fed. Rep. of Germany ....... 2712676

[51] Int. Cl.² .................................................. E06B 9/00
[52] U.S. Cl. ........................................ 52/202; 52/404; 52/63
[58] Field of Search ..................... 52/63, 202, 404; 85/5 P; 151/41.7; 24/221 R, 109, 156 P, 157 R, 153.1, 162; 160/84

[56] References Cited

U.S. PATENT DOCUMENTS

| | | | |
|---|---|---|---|
| 2,232,533 | 2/1941 | Illsche | 24/221 R X |
| 2,648,882 | 8/1953 | VanBuren | 24/109 |
| 3,238,835 | 3/1966 | Rosenberg | 52/404 X |
| 3,375,831 | 4/1968 | Serbus | 52/63 |
| 3,575,079 | 4/1971 | Smith | 85/5 P |
| 3,849,839 | 11/1974 | Zimber | 24/221 R X |
| 3,881,288 | 5/1975 | Fay | 52/404 |
| 3,930,344 | 1/1976 | Gahler | 52/63 X |
| 3,975,879 | 8/1976 | Birch et al. | 52/404 |
| 3,979,802 | 9/1976 | Bongartz et al. | 24/221 R |
| 4,045,076 | 8/1977 | Day et al. | 151/41.7 X |

*Primary Examiner*—J. Karl Bell
*Attorney, Agent, or Firm*—Joseph A. Geiger

[57] ABSTRACT

An inexpensive detachable insulating cover assembly for greenhouses and similar heated structures, using plastic cover sheets for the creation of an enclosed insulating layer, the sheets being held in place by means of rows of manually clampable and releasable fastener assemblies. A typical fastener assembly consists of a fastener base, preferably glued to a structural member of the greenhouse, and a fastener cap which is insertable over and lockable against an upstanding central stem of the fastener base, thereby clamping the cover sheet between cooperating clamping flanges. The locking action between the fastener base and fastener cap may be obtained with the aid of screw-type cam surfaces or friction surfaces. The edges of the cover sheets are folded back to form sealing lips.

15 Claims, 27 Drawing Figures

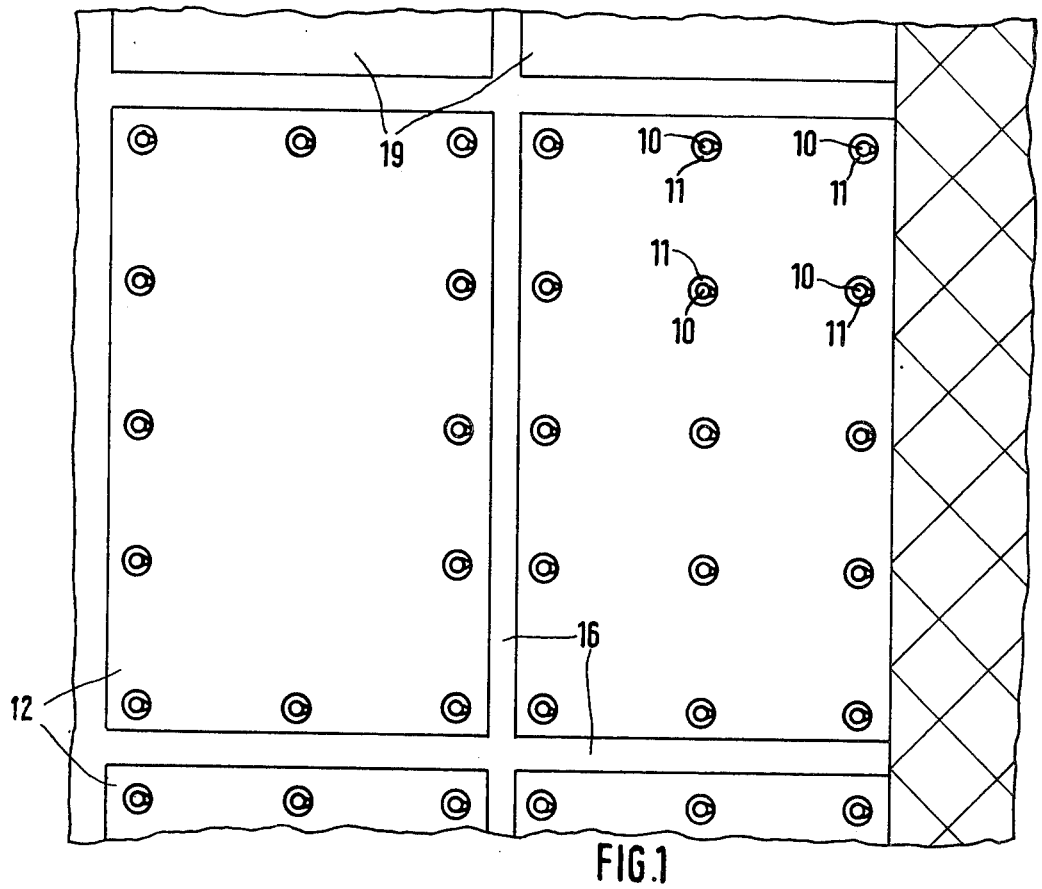
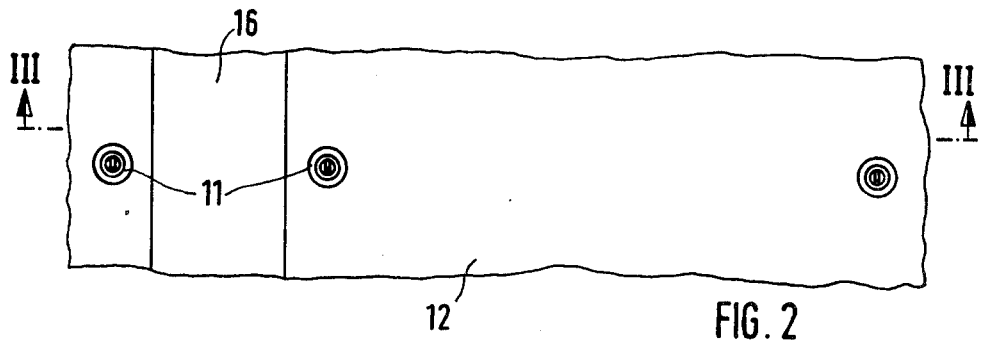
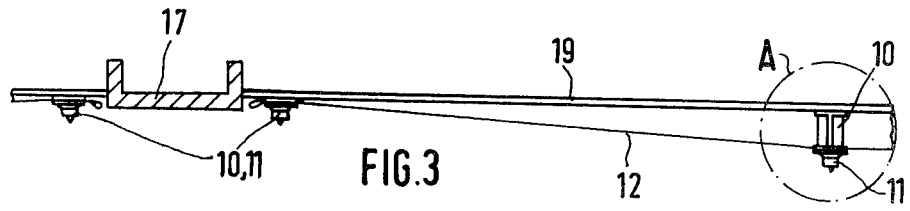

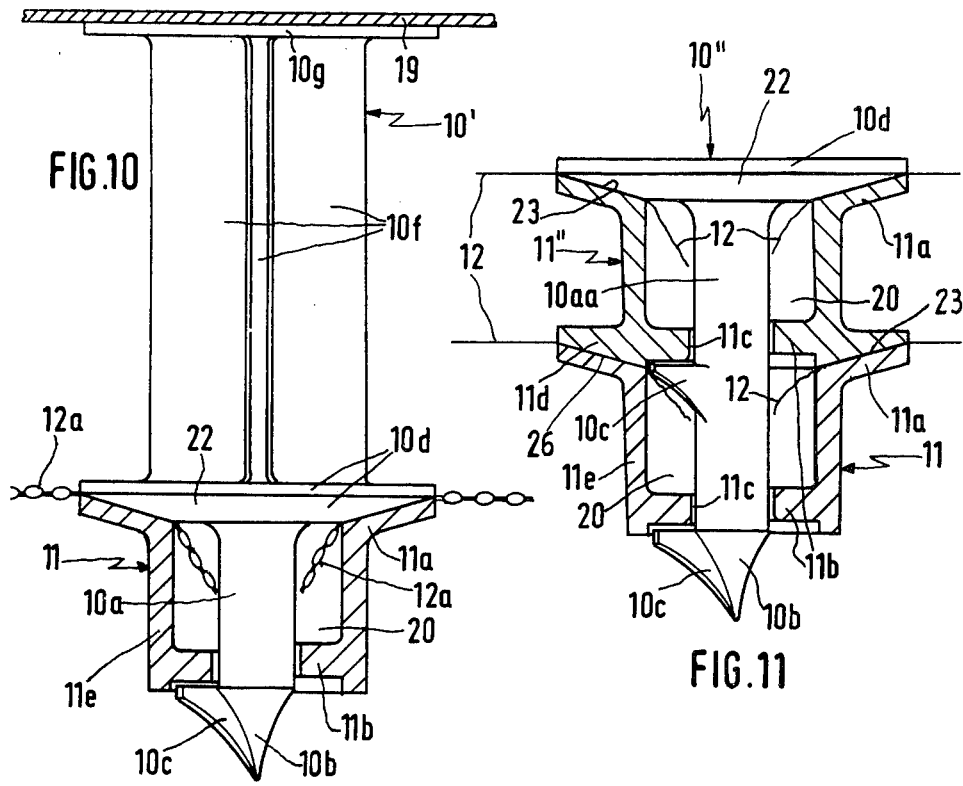
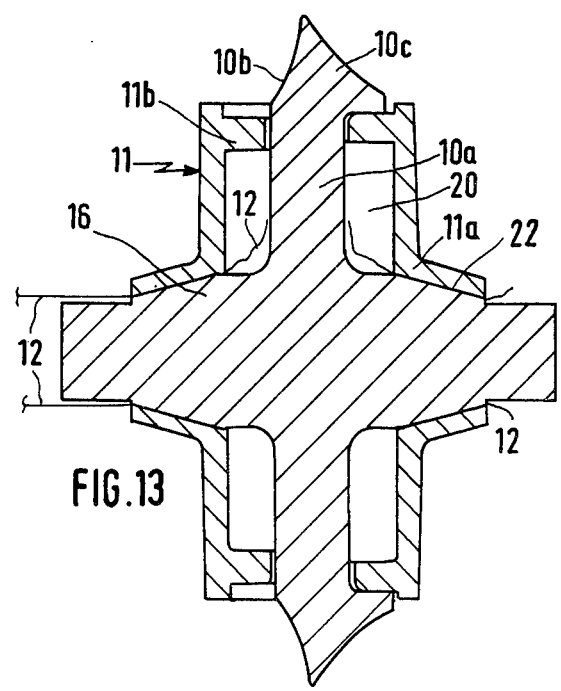

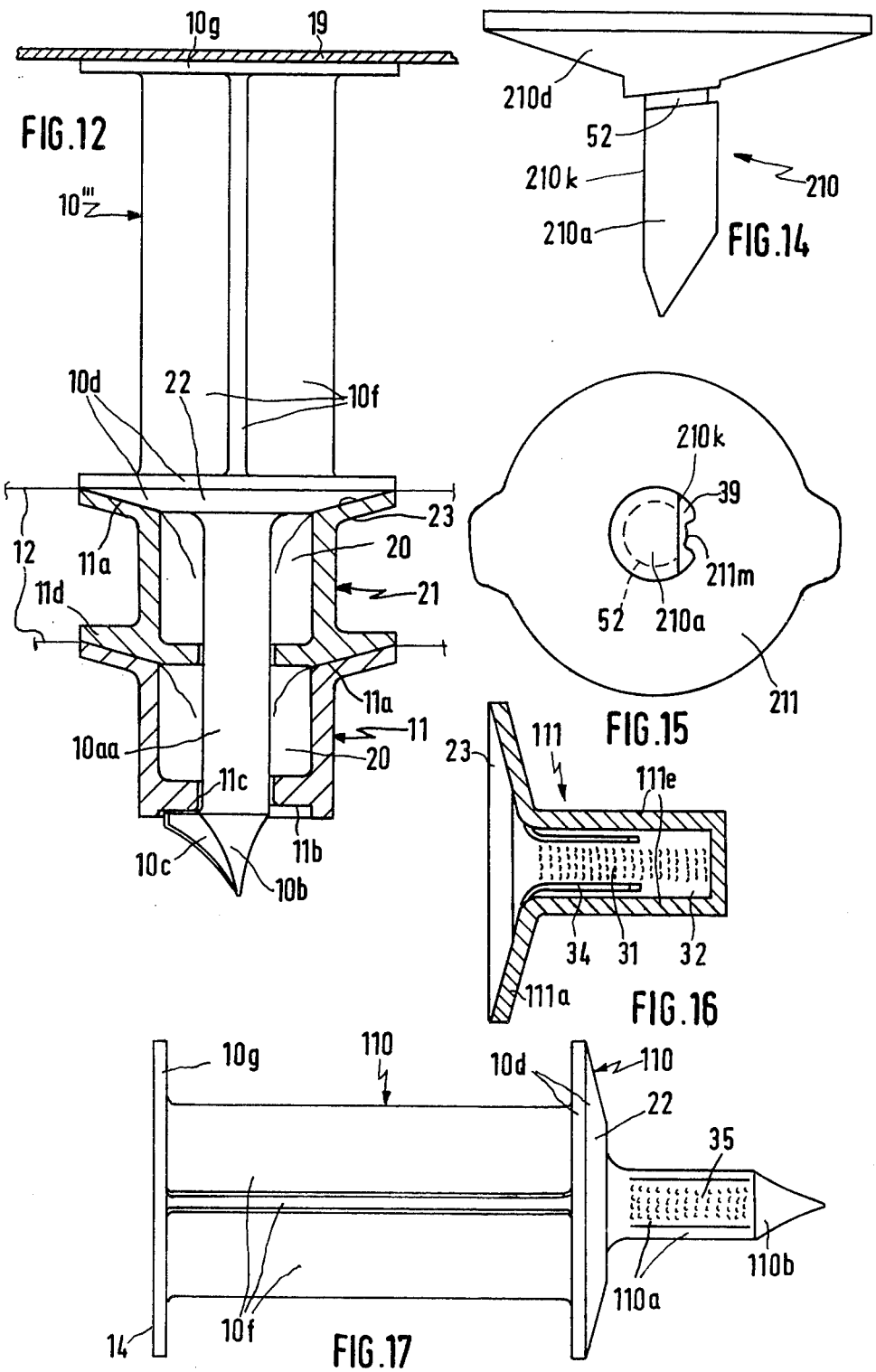

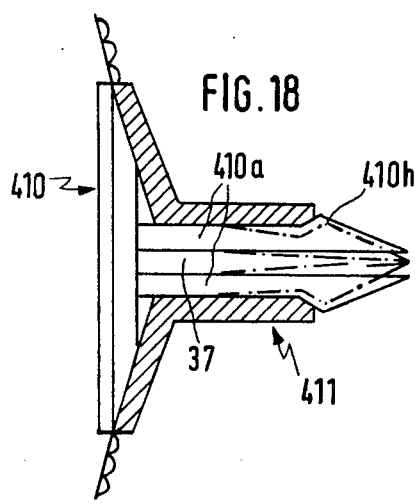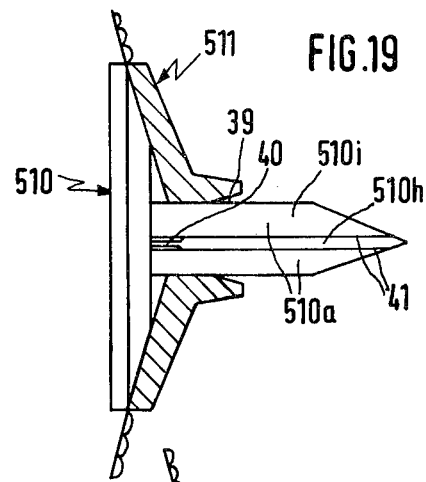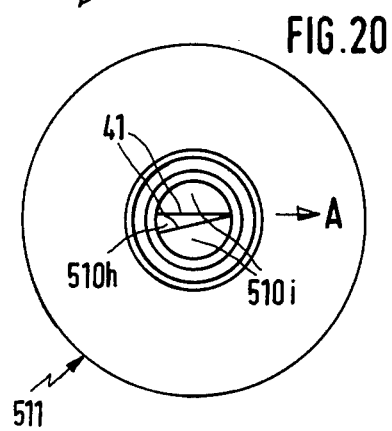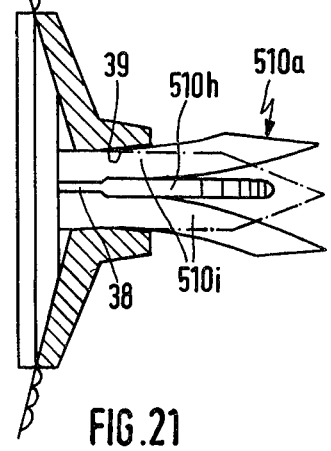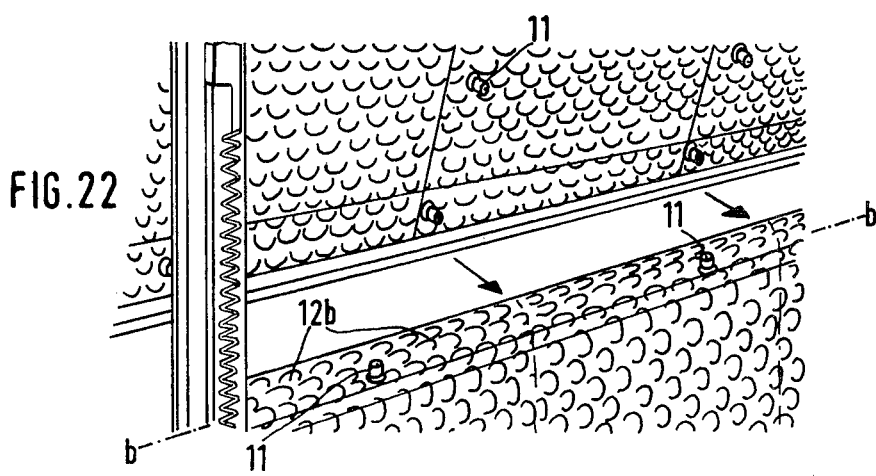

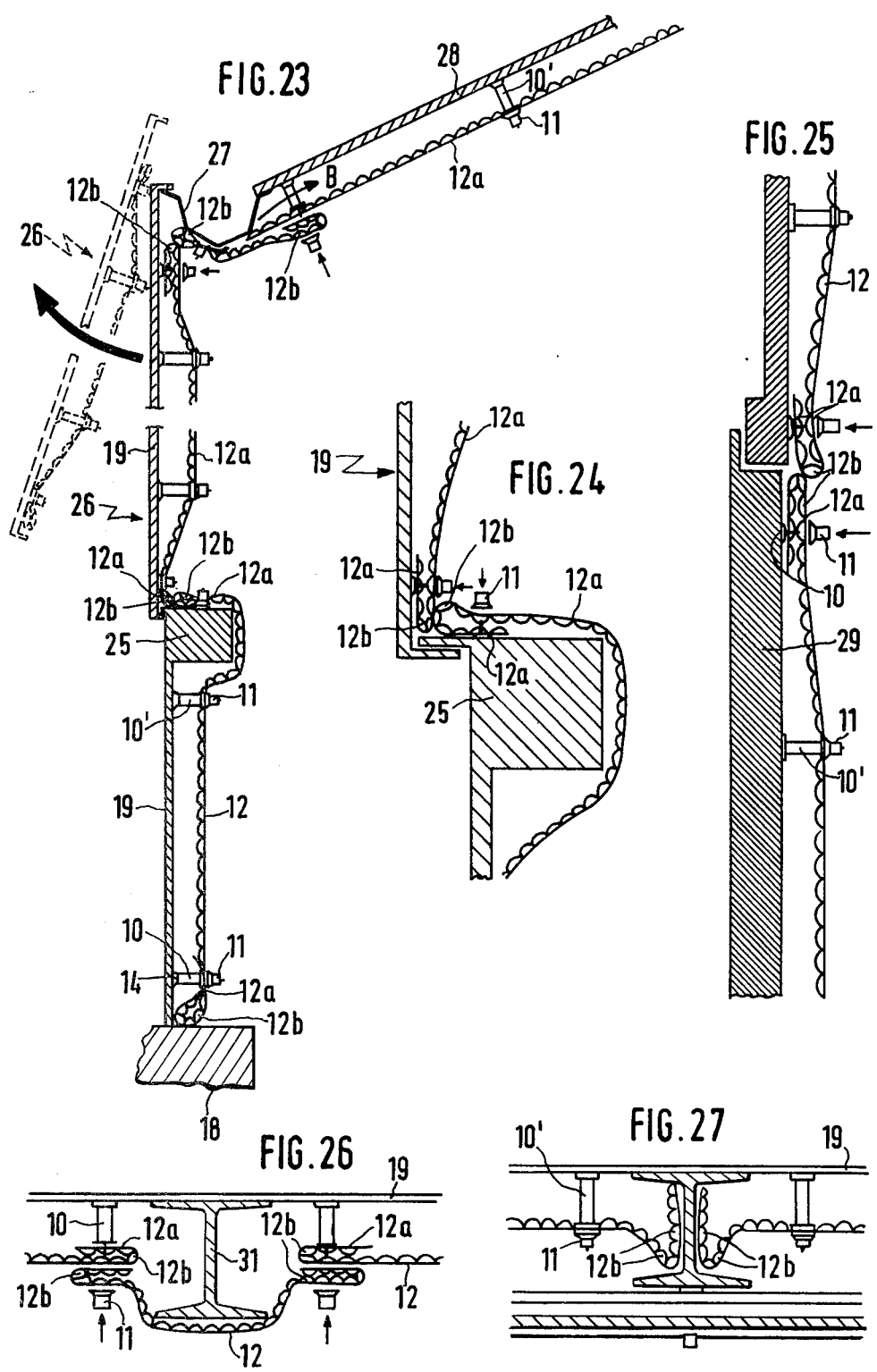

4,174,596

DETACHABLE INSULATING COVER ASSEMBLY FOR GREENHOUSES AND THE LIKE

BACKGROUND OF THE INVENTION

1. Field of the Invention

The present invention relates to flexible insulating cover structures, and, more particularly, to a detachable insulating cover assembly which is particularly suited for use in connection with greenhouses and similar applications, where large surface areas of a structure have to be covered with removable low cost insulating members.

2. Description of the Prior Art

It is known from the prior art that the heat loss through the walls of greenhouses and other heated structures can be greatly reduced through the use of inexpensive insulating cover members of plastic sheet material which are attached to the surfaces of the greenhouse. Comparative measurements have shown that energy savings of up to forty percent are achievable. Particularly advantageous for this purpose are plastic sheets which consist of two layers with small air cushions enclosed between them, so-called bubble sheets.

In one known application, large members of bubble sheet plastic have simply been bolted to the surfaces of a greenhouse, using screws and nuts with hold-down washers (described in the periodical "Zierpflanzenbau", Issue No. 9, Apr. 28, 1976, pp. 315-318).

In another known installation of this type, the plastic sheet cover members are attached to the greenhouse structure by means of special attachment fasteners which consist of a flat fastener base which is attached to a fastener stem whose rear extremity forms a ring. A fastener cap matching the fastener base is engageable over a forwardly extending portion of the fastener stem so as to firmly clamp the sheet between the base and cap, after it has been pierced by the extremity of the fastener stem. Once assembled, this fastener cannot be opened by hand. When the fastener members are pried apart with a tool, they are frequently unsuitable for reuse. These fastener assemblies are used in conjunction with attachment cables, a row of spaced fasteners being arranged near the edge of the plastic cover member, so as to either hang the cover member by one of its edges, or to stretch the cover member between parallel edges, when two or more spaced attachment cables are used. (Such an arrangement is described in a publication by BASF: "Kunststoffe in der Anwendung"—Werkstoffblatt 7013.1.02, October 1974, page 3.).

SUMMARY OF THE INVENTION

It is the primary objective of the present invention to suggest an improved insulating cover assembly, using low cost plastic cover members of large surface area and high insulating capability, whereby the attached edges of the cover members are readily detachable and reattachable to the supporting structure, for the access to and opening of windows, vent panels, and the like, or for the convenient complete removal of the cover assembly, when temperature conditions no longer require insulation of the structure.

The present invention proposes to attain this objective by suggesting an insulating cover assembly combining plastic cover sheets with special fastener assemblies which feature a pair of manually clampable and readily releasable members holding between them an edge portion of the plastic sheet. One member of the fastener assembly is permanently attached to the greenhouse structure, while the other member takes the form of a knurled button, serving as a clamping cap.

In order to safely clamp the plastic sheet between them, the two members of the fastener assembly have large clamping flanges engaging the plastic sheet therebetween. A plurality of fastener assemblies are preferably arranged along a clamping line near an edge of the cover sheet, the overhanging edge portion of the cover sheet thereby serving as a flexible sealing lip. Additional fastener assemblies may be arranged intermediate the edges of a cover member, in the case of large-area sheets.

In a preferred embodiment of the invention, the fastener assembly features a first, permanently attached member with a large circular fastener base which is designed to be glued onto a smooth surface of the greenhouse structure. Protruding perpendicularly from the fastener base is a pointed stem with a laterally offset retaining nose. Over the stem of the first member is engageable a second member in the form of a hollow button or cap, having a likewise circular clamping flange arranged on one axial end of a tubular portion and a cam helix on the other axial end thereof, the cam helix engaging the retaining nose at the extremity of the stem of the first member in such a way that, when the fastener cap is rotated after engagement, it is screwed tight against the fastener base. The plastic sheet surrounding the stem of the first member is thereby firmly clamped between the opposing clamping flanges of the two members of the fastener assembly.

The assembly is readily releasable manually by simply rotating the fastener cap in the reverse sense, whereupon it can be simply slipped out of engagement with the permanently attached first member. The two constituent members of the fastener assembly are preferably made of injection-molded plastic material.

A particular advantage of the novel fastener assemblies of the present invention lies in the fact that these assemblies permit clamping of the edge portion of an insulating sheet at a fixed regular distance from the supporting surface; the latter may be a glass panel, a protruding ledge, a portion of the gutter, or some other structural component. If the fastener assemblies are appropriately spaced along the clamping line, the insulating sheet forms a near straight sealing lip on the edge portion outside the clamping line, thereby greatly improving the air tightness of the space between the building structure and the plastic sheet. These fastener assemblies also make it possible to attach special sealing webs along critical insulating lines which cooperate with the edges of adjacent larger insulating sheets to form a reliable air seal.

The present invention further provides for the convenient adaptation of the novel fastener assembly to a variety of shapes and dimensions of the supporting structure by suggesting that the permanently attachable fastener member be produced in different heights, so as to make it possible to space the clamping plane of the insulating sheet from the supporting structure in accordance with the shape and configuration of the latter.

The permanently attachable fastener member may further be adapted to cooperate with two stacked-up clamping caps, for the simultaneous attachment of two superposed layers of insulating sheet at their overlapping edge portions, for example. The two clamping caps may be so arranged that they produce separate clamping actions with the stem of the attached fastener member, or they may be so arranged that only the outer clamping cap has clamping means, the clamping action of which also engages the intermediate clamping cap.

In still another embodiment of the invention, the permanently attached fastener member may be formed as an integral portion of a plastic molding or mounting profile which is permanently attached to the building structure which is to be insulated. Such a molding may be arranged for the attachment of insulating sheets on only one side, or on both sides.

As a further alternative to the earlier-described preferred embodiment of the novel fastener assembly of the invention, it is further suggested that the retaining nose of the attachment fastener member and the cooperating cam helix of the fastener cap may be replaced with appropriate cooperating frictional configurations of the two fastener members by providing for radial deformability of the tubular portion of the fastener cap, and/or by providing for radial deformability of certain sections of the stem of the permanently attached fastener member.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 shows a detachable insulating cover assembly in accordance with the present invention, featuring a plurality of manually releasable fastener assemblies arranged within the area of a cover sheet which is mounted on a wall section of a greenhouse, for example;

FIG. 2 shows a typical portion of the arrangement of FIG. 1, at an enlarged scale;

FIG. 3 is a cross section through the assembly portion of FIG. 2, taken along line III—III thereof;

FIG. 10 shows the fastener base of FIG. 6 and the cross sectioned fastener cap of FIG. 8 in the assembled position, clamping an insulating sheet therebetween;

FIG. 11 shows a modification of the fastener assembly of FIG. 10, designed for the clamping of two superposed layers of insulating sheet between a fastener base and two cooperating, individually clampable fastener caps (shown in cross section);

FIG. 12 shows a further modification of the fastener assembly of FIG. 10 which differs from the assembly of FIG. 11 in that the intermediate clamping cap is replaced with a clampable spacer member;

FIG. 13 shows a modification of the fastener assembly of the invention, where the fastener base is provided as an integral extension of a plastic molding or mounting profile of the supporting structure;

FIGS. 14 and 15 show another embodiment of a fastener assembly, in which the fastener cap has a retaining nose which engages a cam groove of the fastener base;

FIGS. 16 and 17 show still another embodiment of a fastener assembly, in which the fastener cap and the stem of the fastener base engage each other through friction;

FIG. 18 shows a fastener assembly in which the stem of the fastener base is longitudinally split so as to form radially flexible members, the fastener cap being shown in cross section;

FIG. 19 shows still another embodiment of a fastener assembly, as part of the present invention, in which the stem of the fastener base is likewise longitudinally split to form radially outwardly flexing tongues, the fastener cap being shown in cross section;

FIG. 20 is a plan view of the assembly of FIG. 19;

FIG. 21 shows the assembly of FIG. 19 in the locked position;

FIG. 22 is a perspective view showing a portion of a greenhouse which is insulated by means of a cover assembly, as suggested by the present invention;

FIG. 23 is an elevational cross section through a portion of a greenhouse wall supporting a cover assembly as suggested by the present invention;

FIG. 24 shows an enlarged detail of the cross-sectioned structure of FIG. 23;

FIG. 25 shows another enlarged detail of the assembly of FIG. 23, as adapted to a pivotable vent panel; and FIGS. 26 and 27 show the arrangement of the edges of several cover sheets in the vicinity of an I-beam member of a greenhouse structure.

DESCRIPTION OF THE PREFERRED EMBODIMENTS

The proposed insulating cover assembly of the present invention, as applied to a greenhouse structure, for example, consists of large flexible cover sheets of plastic material which are held in place on the structural components of the greenhouse by means of a plurality of novel fastener assemblies. These fastener assemblies are manually clampable and detachable, for the convenient attachment and removal of each cover sheet, as will be described further below.

A sample arrangement of such an insulating cover assembly is shown in FIGS. 1-3 of the drawings. There, it can be seen that several window panes 19 of a structure are covered with matching cover sheets 12, each sheet being held in place, in a moderately taut hold, by means of rows of fastener assemblies which are placed in the vicinity of the edges of the cover sheet 12. Additional fastener assemblies may be provided in the mid-portion of the cover sheet. These intermediate fastener assemblies may be modified to provide a greater air space between the window pane 19 and the cover sheet 12 (see FIG. 3).

Figure 4:
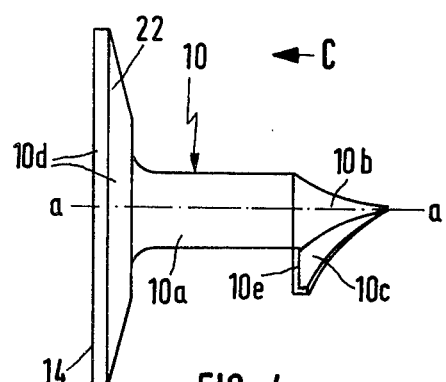
FIG. 4 is a side view of a fastener base constituting a first member of a releasable fastener assembly of the invention.
Figure 5:
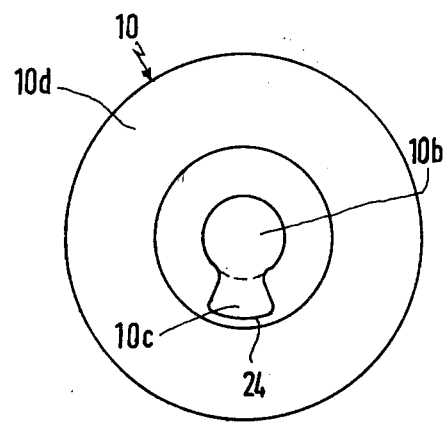
FIG. 5 shows the fastener base of FIG. 4 in a plan view, as seen in the direction of arrow C.
Figure 6:
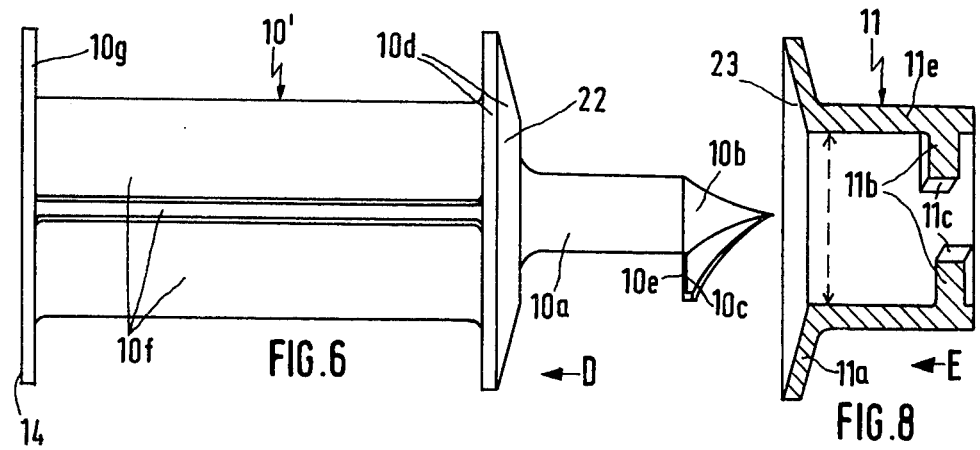
FIG. 6 is a side view of a modified fastener base of increased height which is otherwise similar to the fastener base of FIG. 4.
Figure 8:
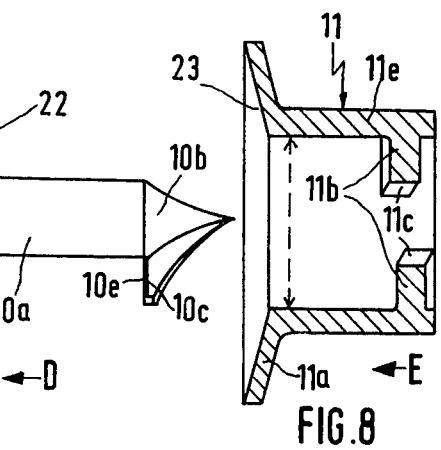
FIG. 8 is a longitudinally cross-sectioned representation of a fastener cap.
Figure 7:
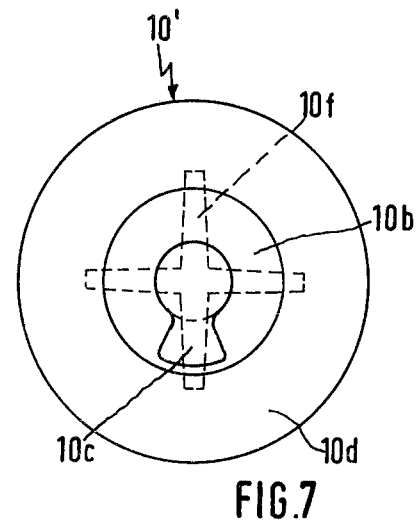
FIG. 7 is a plan view of the fastener base of FIG. 6, as seen in the direction of arrow D.

A first basic embodiment of the novel fastener assembly of the invention is illustrated in FIGS. 4 through 13. Such a fastener assembly consists essentially of two cooperating parts, a fastener base 10, as shown in FIGS. 4 and 6, for example, and a fastener cap 11, as shown in FIG. 8.

The fastener base 10 has a circular clamping flange 10d, with a slightly tapered sheet clamping surface 22 facing axially forwardly from the clamping flange 10d, and a generally cylindrical stem 10a extending axially forwardly from the center of the clamping flange 10d. The rearwardly facing side of the clamping flange 10d is preferably a planar surface 14, serving as an adhesion face, for the permanent attachment of the fastener base 10 to a smooth surface of the greenhouse structure with a suitable adhesive.

At its forward end, the central stem 10a of the fastener base 10 has a pointed extremity 10b and a radially protruding retaining nose 10c, giving the stem extremity a hook-like configuration. The retaining nose 10c thereby forms a rearwardly oriented cam face 10e which approximately coincides with a radial plane. When seen from the front, as shown in FIG. 5, the retaining nose 10c occupies approximately a 45-degree sector, having a somewhat enlarged rounded outer contour 24.

FIG. 6 shows a modified fastener base 10', where the clamping flange 10d, its tapered clamping surface 22, and the centrally extending stem 10a are unchanged from the configuration of FIG. 4, but where the adhesion face 14 is shifted a considerable distance to the rear of the clamping flange 10d, as part of a separate base flange 10g. Longitudinal connecting ribs 10f, arranged in the form of a cross profile, form a rigid connection between the base flange 10g and the clamping flange 10d. This configuration of the fastener base 10' means that its sheet clamping surface 22 is spaced away from the base surface to which the fastener base 10' is attached at its adhesion face 14.

Cooperating with the fastener base 10 of FIG. 4, or with the stretched fastener base 10' of FIG. 8 is a fastener cap 11 which is shown in FIG. 8. The fastener cap 11, its shape somehow resembling that of a tuning button, consists essentially of a tubular wall 11e, having on one axial extremity a radially enlarged clamping flange 11a, and near the other axial extremity a radially inwardly extending cam helix 11b with a central guide bore 11c. The axially rearwardly facing extremity of the clamping flange 11a has a shallow taper matching that of the earlier-described sheet clamping surface 22 of the fastener base 10 or 10', respectively.

Figure 9:
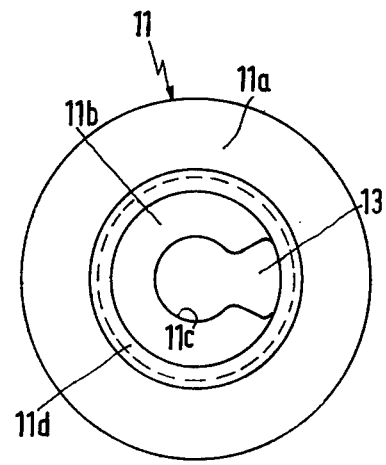
FIG. 9 shows the fastener cap of FIG. 8 in a plan view, as seen in the direction of arrow E.

Referring to FIG. 9, there can be seen that the cam helix 11b of the fastener cap 11 occupies less than a full 360-degree angle, thus leaving open a sector-shaped axial passage 13. As will be readily apparent from the drawing, the passage 13 of the fastener cap 11 allows for the retaining nose 10c of the fastener base 10 to pass therethrough, so as to engage the front side of the cam helix 11b with its cam face 10e, when the fastener cap 11 is engaged over the stem 10a of the fastener base. The fastener cap 11 can now be rotated, whereby its cam helix 11b cooperates with the cam face 10e of the fastener base 10 or 10c, respectively, causing the fastener cap 11 to be screwed axially against the clamping flange 10d, until the sheet clamping surfaces 22 and 23 of the two members abut in a clamping action. A plastic sheet placed therebetween, after having previously been pierced by the pointed extremity 10b of the fastener base 10, can thus be clamped and held firm by a simple rotation of the fastener cap 11.

The angle of inclination of the cam helix 11b from a radial plane is such that the cam action between its forward side and the cam face 10e of the fastener base is self-locking, meaning that the axial counter-pressure created by the clamping action at the clamping surfaces 22 and 23 will not cause the fastener cap 11 to rotate in the sense of releasing the clamping action. However, the fastener cap can be released and removed effortlessly by hand, by simply executing a reverse rotation of the cap 11, followed by its withdrawal from the fastener base 10, the sector-shaped passage 13 permitting it to move past the retaining nose 10c. The cam helix 11b of the fastener cap is preferably so inclined that it produces an axial displacement of between 1 and 4 mm, and the axial position of the retaining nose 10c is preferably such that the clamping rotation requires approximately one-half turn.

Both the fastener base 10 and the cooperating fastener cap 11 are preferably injection-molded plastic parts. The fastener cap 11 may have axially oriented ribs or some other surface structure arranged on the outside of its tubular wall 11e, in order to facilitate its manipulation during assembly and removal. It will be noted that, while the central guide bore 11c at the inner radial periphery of the cam helix 11b cooperates with the central stem 10a of the fastener base, the tubular wall 11e itself forms an annular space 20 around the central stem 10a, as is shown in FIG. 10. Into this annular space 20 may extend a collar portion 12a of the cover sheet 12, after the latter has been pierced.

A cover sheet assembly is initially installed by first determining the number and locations of the fastener assemblies required for the installation. At each fastener assembly location is then mounted a fastener base 10, or 10', as the case may be (see FIGS. 1-3), whereupon the plastic cover sheet 12 is impaled over the pointed stems 10a of the fastener bases 10 and 10', while being held taut in the intended position. The cover sheet 12 is then clamped in place by attaching to each fastener base 10 or 10' a fastener cap 11 in the manner described further above. It should be understood that, instead of attaching the fastener bases 10 to the structure by means of an adhesive, suitable alternative attachment means could also be provided, using clamps, threaded fasteners, blind rivets, or any other known wall fastener devices.

Whereas the insulating cover sheets of FIG. 1 are separated from each other by moldings 16 or other mounting profiles, there may be situations where it is desirable to mount adjoining cover sheets in such a way that they form an overlap with one another. It this case, it is, of course, desirable to use a single row of fastener assemblies for the attachment of both cover sheet edges. While it is possible to simply clamp two cover sheet layers between the clamping flanges of the earlier-described two-piece fastener assembly, this may not be the ideal solution, especially where one of the cover sheets is to be removed from time to time, while the other cover sheet is to remain clamped in place.

For this purpose, the invention suggests a modified fastener assembly, shown in FIG. 11, which features a fastener base 10" with an extended central stem 10aa, having two retaining noses 10c cooperating with two separate fastener caps 11 and 11". As can readily be seen in FIG. 11, the inner fastener cap 11" clamps a first layer of cover sheet 12 between the sheet clamping surface 22 of the clamping flange 10d of the fastener base and the sheet clamping surface 23 of the fastener cap 11", while the outer fastener cap 11 clamps a second cover sheet 12 between its sheet clamping surface 23 and a matching outwardly facing sheet clamping surface 26 of the inner fastener cap 11". For this purpose, the latter is provided with an enlarged clamping flange 11d at its outer end. Except for this clamping flange at its outer end, the inner fastener cap 11" is identical with the outer fastener cap 11. The latter is unchanged from the previously described fastener cap.

Another possibility of arranging two fastener caps on a single fastener base is shown in FIG. 12. Here, the inner fastener cap 21 is not separately clamped against the fastener base 10''', but serves essentially only as a spacer member for the two cover sheets 12. Only the outer fastener cap 11 provides the clamping action at both pairs of sheet clamping surfaces. The outer fastener cap 11 is again unchanged from the previously described embodiments, while the inner fastener cap 21 has again inner and outer clamping flanges 11a and 11d, but only a simple planar wall with a bore in the place of the previously mentioned cam helix. Whereas the fastener base 10''' of this embodiment features a base flange 10g which is axially spaced from the clamping flange 10d, with intermediate connecting ribs 10f, it should be understood that either of the two base configurations of the fastener base can be provided for each of the three fastener cap configurations which have been described further above.

In FIG. 13 is illustrated still another modification of the fastener assembly of the invention. Here, the fastener base is no longer a separate part which is attachable to a supporting surface, but forms an integral extension of a molding or mounting profile 16. In the particular embodiment shown, two such integrally attached fastener bases are arranged on opposite sides of the molding 16. These fastener bases are designed to cooperate with the same fastener cap 11 that has been described previously in connection with FIG. 8. This particular application of the invention is especially suitable for situations where no window panes are being used at all, and where two plastic sheets take their place instead.

Referring to FIGS. 14 and 15 of the drawing, there is shown a different version of a fastener assembly which is usable in the place of the previously described fastener assembly. The fastener base 210 (FIG. 14) has again a clamping flange 210d from which extends a central stem 210a. The latter, however, while having an overall cylindrical outline with a pointed extremity, has a portion of its cross-sectional profile flattened to form a facet 210k. Near the inner end of the stem 210a is further arranged a helical groove 52, one peripheral end of the groove opening into the facet 210k, at the base of the latter. The cooperating fastener cap 211 (FIG. 15) is a simple dish-shaped disc with a tapered outline and a central bore 39 fitting over the diameter of the central stem 210a of the fastener base 210. On the periphery of the bore 39 is further arranged a radially inwardly extending retaining nose 211m which is designed to cooperate with the helical groove 52 of the fastener base 210.

In order to assemble the two members of this fastener assembly, the nose 211m of the fastener cap 211 is rotated into alignment with the facet 210k of the fastener base 210, at which point the cap 211 can be inserted axially over the stem 210a (see FIG. 15). Once inserted, the fastener cap 211 is rotated clockwise, so that its retaining nose 211m becomes engaged in the helical groove 52 of the fastener base 210, thereby screwing the two members together until their tapered sheet clamping surfaces abut in a clamping action. Although the actual configuration of this embodiment differs substantially from that of the previously described embodiments of the novel fastener assembly, the manipulative steps required for attachment and release of a cover sheet are essentially the same in both cases. Similarly, the fastener base 210 may be modified to cooperate with more than one fastener cap 211, by simply adding one or more helical grooves 52 at the appropriate axial spacing.

In FIGS. 16 and 17 is shown a third version of a fastener assembly embodying the present invention. In contrast to the previously described embodiments, where the fastener cap is "screwed" over the stem of the fastener base, this configuration provides for the fastener cap 111 to be axially pressed into the stem 110a of the fastener base 110, against a frictional resistance which retains the assembled fastener members in a clamped relationship. The frictional resistance is obtained through a surface roughness 31 in a tubular portion 111e of the fastener cap 111 and a similar surface roughness 35 on the outer diameter of the stem 110a of the fastener base 110, in cooperation with longitudinal slits 34 in the fastener cap 111 which allow for an elastic radial deformation of its tubular portion 111e.

The surface roughnesses 31 and 35 of the fastener cap 111 and of the fastener base 110 do not completely cover the surfaces of the respective bore and stem, but are interrupted, so as to form diametrically opposite pairs of cooperating strips of surface roughness which cover slightly less than 90 degrees of the bore and stem circumference, respectively. This means that, when the assembled fastener cap 111 is rotated one-quarter turn in either direction, the surface roughnesses 31 and 35 become disengaged and the fastener cap 111 slides easily from the stem 110a of the fastener base 110. Since it is thus not necessary for the surface roughnesses to allow for displacement in both directions, it is possible to use a self-locking sawtooth profile for the latter. The clamping action of the sheet clamping surface 23 of the fastener cap 111 against the matching sheet clamping surface 22 of the fastener base 110 is enhanced by the slots 34 in the fastener cap which give the latter a limited axial deformability, when the fastener cap is manually pressed onto the fastener base.

In FIG. 18 is shown a modified embodiment of the fastener assembly of the invention in which a fastener cap 411 and a fastener base 410 produce a clamping action as a result of two retaining noses 410h on the stem 410a which engage the outer end portion of the fastener cap 411. The latter has again a tubular portion with a central bore and, in order for said bore to be engaged over the stem 410a of the fastener base 410, the stem 410a is slotted longitudinally. The width of the longitudinal slot 37 is such that, when it is closed at the pointed extremity of the stem through radial deformation of both stem legs, the retaining noses 410h just fit into the bore of the fastener cap 411. It follows that, unlike in the previous embodiments, the fastener cap 411 of this assembly snaps into the clamped position, being held there by the noses 410h of the radially flexible stem 410a. To remove the fastener cap 411 from its clamped position, it is simply pulled outwardly over the retaining noses 410h of the fastener base 410, against the sliding resistance produced by the noses 410h, as the latter are being bent together in the radial sense.

Still another embodiment of the fastener assembly is shown in FIGS. 19–21. Here, the stem 510a of the fastener base 510 is again slotted in the longitudinal sense, but the slot 41 is of wedge-shaped cross section and inside it is arranged a flexible wedge-shaped stem sector 510h (see FIG. 20). The bore 39 of the fastener cap 511 has an inner portion which fits the diameter of the stem 510a, while an outer portion thereof is enlarged with a slight taper. The two members of this configuration are assembled as follows: Initially, the fastener cap 511 is simply engaged over the stem 510a of the fastener base 510, the stem having normally a cylindrical outline. With the fastener cap 511 in place, the two major stem sectors 510i of the fastener base 510 are spread radially apart by bending the wedge-shaped stem sector 510h radially inwardly between them, thereby wedging the stem sectors 510i apart, as is shown in FIG. 21. The outspread stem sectors 510i now engage the tapered portion of the cap bore 39, thereby preventing the fastener cap 511 from releasing its clamping action. This assembly mode produces a positive locking action on the fastener assembly which can only be released by bending the wedge-shaped stem sector 510h back to its original axial outline.

The heat-retaining action of the insulating cover assembly of the invention is primarily the result of the creation of an enclosed air layer between the cover sheets and the walls or window panes 19 of the structure which is to be insulated. This stationary air layer is not subject to the convective air currents which otherwise are created through the loss of heat from the warm inside air in contact with the colder wall or window pane. A most important aspect of this approach to a more effective building insulation is the arrangement of the edges of the insulating cover sheets for maximum air tightness. Preferred examples of such arrangements, in conjunction with the novel fastener assemblies of the present invention, will be described in the following, with particular reference to FIGS. 22 through 27.

While it is possible to utilize ordinary plastic sheet stock as cover sheets, it has been found that the use of so-called bubble sheets not only provides for more effective insulation, but also simplifies the creation of sealing lips 12b at the edges of the cover sheets 12. Thus, it is in most cases sufficient to simply fold back an edge portion of the cover sheet 12 towards the clamping line (line b—b in FIG. 22), in order to provide such an acceptable sealing edge. In the case of ordinary plastic stock, a simple fold may not be enough, and multiple folds or accordion-like pleats may have to be resorted to.

In the case of bubble sheet stock, the folding of an edge portion is greatly facilitated, firstly, through the presence of straight fold lines resulting from the bubble pattern and, secondly, through the tendency of the bubble sheet to reopen the fold, thereby producing a rounded loop and a comparatively stiff sealing edge, rather than the poorly defined fold which is normally obtained with flat plastic sheet stock. The sealing edges 12b of a cover panel are preferably so arranged that the back-folded portion of the cover sheet 12 reaches over the clamping line b—b and that the fastener assembly 10/11 clamps both layers of the cover sheet.

As can be seen in FIGS. 23-25, it is in most instances preferable to utilize the short fastener assembly of FIGS. 4 and 8 on those edge clamping lines which call for a sealing lip 12b. The aim is for the sealing lip 12b not only to bear against the sealing lip of the adjoining cover sheet, but also to bear against the supporting surface of the building structure. In the case of additional rows of fastener assemblies which are arranged between the edge clamping lines (FIGS. 23 and 25), and in the case of overlapping edges of adjoining cover sheets (FIG. 26), as well as in other special situations, the stretched fastener assembly of FIG. 10 may be preferable. The use of the stretched fastener assemblies 10'/11 not only increases the thickness of the insulating air layer, it also gives a more taut appearance to the insulating sheet covers 12.

In FIG. 23 can be seen several typical ways of mounting the novel insulating cover assembly of the invention, in adaptation to different structural components of a greenhouse. Underneath the roof panel 28 are arranged rows of long fastener assemblies 10'/11 which hold a cover sheet 12a at a distance underneath the roof panel. The lower row of fastener assemblies also holds the edge of a cover strip which seals off the space underneath the gutter 27, the other edge portion of the cover strip being held in place by fastener assemblies which are attached directly to the underside of the gutter 27.

Adjoining the gutter 27 is a vertical vent window 26 whose open position is shown in dotted lines in the drawing. This vent window 26 has a separate cover sheet which is held in place by four horizontal rows of fastener assemblies. The edges of this cover sheet are so arranged that the cover sheet does not have to be removed, when the window 26 is open. As FIG. 23 shows, this is accomplished by providing separate sealing lips 12b at each edge of the cover sheet 12a in such a configuration that the sealing lips 12b of the window cover sheet just slightly press against stationary sealing lips of the adjoining stationary cover sheets, the gutter cover strip at its upper edge, and a frame member cover sheet at its lower edge. The latter is shown at an enlarged scale in FIG. 24 and in a perspective representation in FIG. 22, where the window 26 is shown in the open position. It can be seen that short fastener assemblies 10/11 (FIGS. 4 and 8) are used for the clamping lines near both sealing lips at the lower edge of the window, and stretched fastener assemblies 10'/11 (FIG. 10) are used for all other clamping locations. The lower sealing lip, arranged at the foundation 18, is likewise a folded-back edge portion of the cover sheet 12 being large enough to create a sealing contact pressure between the lip 12b and the surface of the foundation 18.

FIG. 25 shows the manner in which an insulating cover sheet 12 is attached to a pivotable vent panel whose edge moves inwardly from a fixed wall 29. Again, the edge portions of both cover sheets are folded back and clamped to their respective supporting surfaces by means of short fastener assemblies 10/11, while subsequent rows of fastener assemblies use the stretched fastener base 10'. In this case, the sealing lip 12b of the pivotable vent panel is preferably arranged to slightly overlap the sealing lip of the adjoining stationary cover sheet, so that the former is slightly bent back by the latter, thereby assuring sealing contact between the two lips.

FIGS. 26 and 27 show the treatment of an inwardly protruding structural I-beam, either so that it is fully comprised within the enclosed air space, or so that separate adjoining air spaces are created on both sides thereof, while the inner face of the I-beam is left exposed. In the case of an inclusion of the I-beam 31 in the insulating air space, a special cover strip 12 is placed over the inner side of the I-beam and its edges form an overlap with the edges of the adjoining cover sheets. In this case, it may be advantageous to utilize the fastener assembly of FIG. 11 or FIG. 12 with two stacked fastener caps.

The configuration of FIG. 27 would be chosen in a situation where it is not possible to cover the inner face of the I-beam. In this case, the edges of the adjoining cover sheets may simply be folded against the central web of the I-beam, the earlier-mentioned tendency of bubble sheet plastic to unfold being sufficient to provide adequate sealing contact.

In all cases, where a sealing lip is produced by folding back an edge portion of bubble sheet, it is preferable to fold the bubbles against each other, so as to produce a smooth outer surface for sealing purposes, while the bubbles at the fold line itself produce the earlier-mentioned unfolding tendency, thereby stiffening the fold.

The arrangement of FIG. 23 further offers a convenient approach to selective heating of certain areas of the greenhouse structure. If, for instance, it is desired to heat a certain portion of the roof, in order to melt its snow cover, for example, one simply has to remove the gutter cover strip over the desired length portion of the greenhouse, thereby allowing warm air to rise between the roof panel 28 and the cover sheet 12a, along the arrow B.

It should be understood, of course, that the foregoing disclosure describes preferred embodiments of the invention and that it is intended to cover all changes and modifications of these examples of the invention which fall within the scope of the appended claims.

I claim the following:

1. An easily attachable and detachable insulating cover assembly, particularly suited for application to the wall elements of the side walls and ceiling of a greenhouse, or of a comparable enclosed building structure, where convective heat transfer across said wall elements is to be minimized, the insulating cover assembly comprising in combination:

a cover sheet of resiliently flexible air-impermeable plastic material;

means for mounting said cover sheet of plastic material in relation to a matching wall element of said greenhouse, in a coextensive, transversely spaced relationship, so as to enclose an air space of substantial width therebetween; and means for sealing off the borderlines of said air space, so as to entrap within said air space a stationary air layer which serves as a barrier to convective heat transfer; and wherein said cover sheet mounting means includes a series of fastener assemblies spaced along a clamping line near an edge of the cover sheet, each fastener assembly comprising a pointed stem as part of a fastener base which is permanently attachable to the wall element of the greenhouse, and a fastener cap which is insertable over and securable to said stem, following impalement thereover of the cover sheet, thereby clamping the latter against the fastener base; and said air space sealing means is defined by the edge portion of the cover sheet which is located outside the clamping line, the edge portion forming a fold toward the wall element of the greenhouse, thereby stiffening the cover sheet along the fold and making elastic contact with the wall element, due to the resiliency of the cover sheet in said fold.

2. An insulating cover assembly as defined in claim 1, wherein the cover sheet is of bubble sheet stock, one side of said stock being smooth and flat, the other presenting a regular pattern of rows of plastic-enclosed compressible air bubbles, the cover sheet being so mounted that its side with the bubbles faces towards the wall element of the greenhouse; and the fold of said air space sealing means is such that some of the air bubbles of the two fold-adjoining cover sheet portions are compressed inside said fold, thereby increasing the resiliency of said fold.

3. An insulating cover assembly as defined in claim 2, wherein two cover sheets adjoin each other, their mounting means including coinciding clamping line length portions along which both cover sheets are impaled and clamped on the same fastener assemblies; and the fold length portions of the two cover sheets which are associated with said coinciding clamping line portions are 180-degree folds, and both fold-adjoining sheet portions of the two folds are impaled on and clamped by said fastener assemblies, thereby forming an overlap of two resilient folds.

4. An insulating cover assembly as defined in claim 1, wherein the wall element of the greenhouse is a movable panel, adapted to open and close an aperture in the greenhouse structure;

the assciated cover sheet has an outline matching that of the movable panel, being mounted on the latter by means of fastener assemblies which are located along clamping lines running near the edges of said panel; and the folds of the air space sealing means at the edge portions of the cover sheet are 180-degree folds, and both fold-adjoining sheet portions of the folds are impaled on and clamped by the fastener assemblies, thereby forming protruding sealing lips outside said clamping lines which contact the greenhouse structure in the vicinity of said aperture, when the movable panel is in its closed position.

5. An insulating cover assembly as defined in claim 1, wherein the fastener base of the fastener assembly has a base flange with a flat mounting face carrying an adhesive layer, for attachment of the fastener base to a surface of the greenhouse wall element; and the stem is an integral part of the fastener base, extending upwardly therefrom, at the opposite side of its mounting face.

6. An insulating cover assembly as defined in claim 1, wherein the fastener base of the fastener assembly has a base flange by which it is attachable to a surface of the greenhouse wall element;

the stem of the fastener base is substantially cylindrical in shape, extending upwardly from the base flange and having a radially extending retaining nose with a downwardly oriented cam face near the pointed stem extremity; and the fastener cap has an axial bore and an adjoining groove shaped to permit insertion of the cap over said stem and retaining nose, the cap portion surrounding said axial bore and groove forming an upwardly facing cam helix which, in cooperation with the cam face of the retaining nose on the stem, advances the cap axially against the fastener base, when rotated, thereby retaining it against the fastener base in a clamping engagement.

7. An insulating cover assembly as defined in claim 6, wherein the top side of the fastener base flange serves as a cover sheet clamping flange, and the fastener cap includes on its lower side a cooperating cover sheet clamping flange.

8. An insulating cover assembly as defined in claim 6, wherein the fastener base includes a cover sheet clamping flange arranged at a distance above its base flange, and the fastener cap includes on its lower side a cooperating cover sheet clamping flange of matching shape.

9. An insulation cover assembly as defined in claim 6, wherein the stem of the fastener base further includes a second retaining nose arranged at a distance below said first-mentioned retaining nose; and the fastener assembly further includes a second, similar fastener cap, a first cover sheet layer being clampable between the fastener base and one of said fastener caps, under the action of said second retaining nose, while a second cover sheet layer is clampable between the two fastener caps, under the action of said first-mentioned retaining nose.

10. An insulating cover assembly as defined in claim 6, wherein the fastener assembly further includes a spacer member which is insertable over the stem of the fastener base, ahead of the fastener cap, the spacer member and fastener cap being adapted to simultaneously clamp a first cover sheet layer between the fastener base and the spacer member and a second cover sheet layer between the spacer member and the fastener cap, under the action of the retaining nose.

11. An insulating cover assembly as defined in claim 1, wherein the fastener base of the fastener assembly has a base flange by which it is attachable to a surface of the greenhouse wall element;

the stem of the fastener base extends upwardly from the base flange, having a helical cam groove on its circumference; and the fastener cap has a bore shaped to permit insertion of the cap over the stem, and a radially inwardly protruding retaining nose in said bore which is engageable with the cam groove of the stem, so as to advance the cap axially against the fastener base, when rotated, thereby retaining it against the fastener base in a clamping engagement.

12. An insulating cover assembly as defined in claim 1, wherein the fastener base of the fastener assembly has a base flange by which it is attachable to a surface of the greenhouse wall element;

the stem of the fastener base extends upwardly from the base flange;

the fastener cap has a tubular portion fitting over a length portion of said stem, and longitudinal slots arranged in said length portion which allow the latter to be deformed radially; and the stem and the tubular portion of the fastener cap define between them friction-creating surface roughnesses in the form of serrations which allow for an axial insertion of the fastener cap, under radial deformation of its tubular portion, but retain the cap in a clamping engagement, under the action of said serrations.

13. An insulating cover assembly as defined in claim 12, wherein the surface roughnesses of the stem and cooperating tubular portion of the fastener cap are limited to angularly spaced surface sections on the circumferences of the stem and cap wall, with smooth, slightly recessed surface sections arranged therebetween, so that the roughness sections can be brought into and out of engagement with each other, through a rotational displacement of the fastener cap, for a selective free axial mobility of the fastener cap relative to the stem.

14. An insulating cover assembly as defined in claim 1, wherein the fastener base of the fastener assembly has a base flange by which it is attachable to a surface of the greenhouse wall element;

the stem of the fastener base extends upwardly from the base flange, having two radial retaining noses arranged near its pointed extremity, on opposite sides of the stem, and a transverse slot between said retaining noses extending axially from said extremity towards the base flange; and the fastener cap has a tubular portion fitting over said stem in such a way that, when the cap is inserted over the stem, the retaining noses are forced together, closing the slot between them and, in the fully inserted position of the fastener cap, the retaining noses assume their normal position, retaining the cap by engaging its upper extremity.

15. An insulating cover assembly as defined in claim 1, wherein the fastener base of the fastener assembly has a base flange by which it is attachable to a surface of the greenhouse wall element;

the stem of the fastener base extends upwardly from the base flange, having two longitudinal slits which extend from its pointed extremity towards the base flange, forming two outer stem sectors and a narrow wedge-shaped central stem sector therebetween, the latter being bendable laterally inbetween the two outer stem sectors so as to force them apart; and the fastener cap has a tubular length portion fitting over a lower length portion of said stem, the cap being clampable in the inserted position, when the two outer stem sectors are forced apart by the bent central stem sector.

* * * * *